Jan. 27, 1953  W. M. DUNNOCK  2,626,763
CLOTHESLINE REEL AND TIGHTENER
Filed Aug. 29, 1950

INVENTOR.
WILLIAM M. DUNNOCK
BY Howard J. Whelan
ATTORNEY

Patented Jan. 27, 1953

2,626,763

UNITED STATES PATENT OFFICE 2,626,763

CLOTHESLINE REEL AND TIGHTENER

William M. Dunnock, Baltimore, Md.

Application August 29, 1950, Serial No. 182,087

2 Claims. (Cl. 242—102)

This invention relates to tighteners or winders for clotheslines and more particularly to those that have provision for the prevention of undue unwinding. It has among its objects to provide a new and improved clothesline reel that will avoid some of the disadvantages and limitations of the prior art. Another object of the invention is to provide a new and improved clothesline reel that can be locked readily to prevent unwinding, or hold it in an established wound up position by a simple and effective locking element incorporated in its construction. Other objects will become apparent as the invention is more fully set forth. These objects will be in part indicated specifically, while others will be appreciated from general observation, study and comparison with the known art.

For a clearer comprehension of the invention, and its objects reference is made to the accompanying drawings. These drawings in conjunction with the following explanation present a particular form of the invention, by way of example, while the claims emphasize the scope of the invention.

In the drawings.

Similar parts throughout the figures are designated by the same reference numerals.

Figure 1:
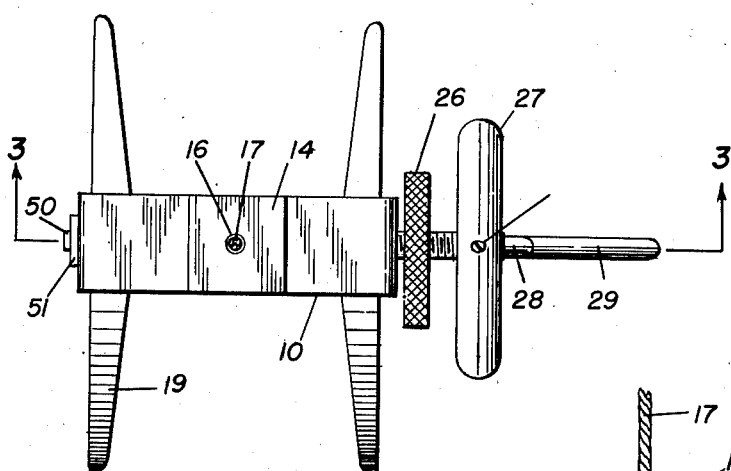
Figure 1 is a plan view of clothesline reel embodying this invention.
Figure 2:
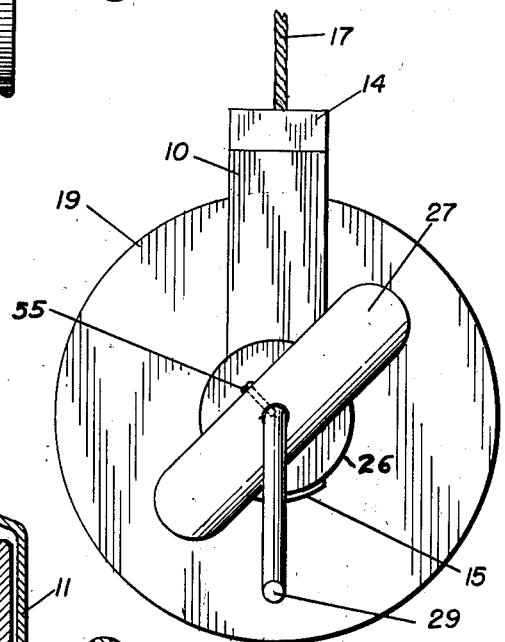
Figure 2 is a side elevation of Figure 1.
Figure 3:
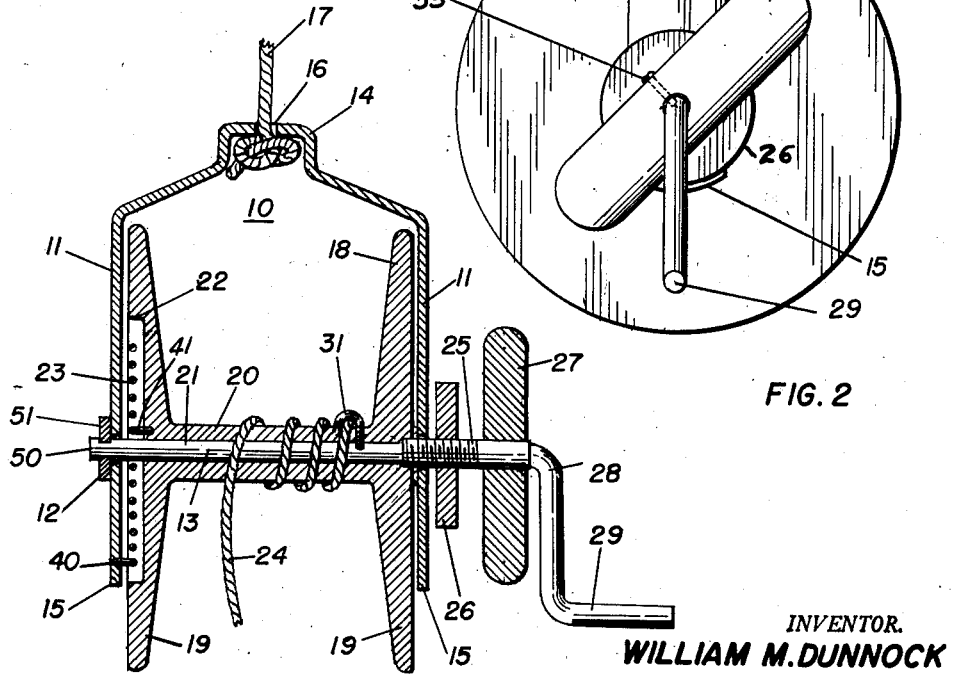
Figure 3 is a sectional view through the reel taken on line 3—3 of Figure 1.

The drawings indicate a clothesline reel of somewhat conventional appearance. It consists of a bifurcated yoke 10 having its arms 11 provided with holes 12 transversely through it for positioning a shaft 13 therethrough. The holes 12 are located towards the free ends 15 for the shaft. A hole 16 for the holding rope 17 is provided in the top or bend 14 of the yoke. The holes 12 serve as bearings for the shaft 13 which supports a clothesline reel 18 thereon. The reel 18 is preferably formed with a central hub 20 made integral with the disc-like walls 19 that encompass the clothesline as it is rolled up thereon. The hub 20 has a passage 21 through it for the shaft 13 to pass through and project beyond the exterior surfaces of the walls 19. One of the walls 19 receives a spiral spring 23 therein. The spring may be flat or round and of spiral form and tends to wind up the reel and coil the clothesline 24 thereon. The stationary end portion 40 of the spring is fastened to the yoke and the other end of the spring 41 is fastened to the wall of the reel 18 as indicated. The opposite end portion of the shaft 13 is larger and screw threaded at 25 and has a nut 26 engaging it. When this nut 26 is screwed towards the adjacent arm 11 of the yoke it binds against this arm and brakes it against the wall of the reel. When the nut is loose it does not obstruct the rotation of the reel. A knob 27 is tightly attached to the shaft 13 so that it can turn it when pressure is needed. The crank 28 and handle 29 are mounted or are part of the shaft 13 to enable the shaft and reel to be rotated by them. The reel is fastened to the shaft 13 by a pin hook 31 that causes them both to be operated together when either is turned. The shaft 13 is undercut at 50 to receive a slotted spring washer 51 to hold the assembly in the yoke 10. A screw 55 is used to tighten the knob 27 to the shaft 13.

When it is desired to place the rope on the reel, the handle 29 is rotated to unwind the spring 23. The end of the rope 24 is then anchored to the reel through the pin 31 and the reel is allowed to wind the rope thereon through the action of the spring 23. The bent portion 14 of the yoke 10 is secured to a wall or post by another rope 17 passing through the hole 16 and secured to the end of the yoke, and the free end of the rope 24 is pulled out from the reel and anchored. The clothes to be dried are placed on the rope 24 and the handle 29 and/or knob 27 is rotated to take the slack out of the loaded line 24 and the nut 26 is tightened against the arm 11 of the shackle 10 to prevent the reel from turning and to relieve the load from the spring 23.

While but one general form of the invention is shown in the drawings and described in the specification, it is not desired to limit this application for patent to this particular form, as it is appreciated that other forms of construction could be made that would use the same principles and come within the scope of the appended claims.

Having thus described the invention what is claimed is:

1. A clothes line reel and tightener comprising a yoke having bifurcated arms, a shaft extending through the said arms, means for securing the shaft to one of said arms, a reel having a hollow hub mounted on said shaft, said reel having end disc walls and one of said disc walls having a recess therein between the said disc wall and the adjacent arm of the yoke, a coil spring housed in said recess, said spring being anchored at one end to the last mentioned disc wall and its opposite end anchored to the last mentioned arm of the yoke, means on the shaft adjacent the other disc wall for adjustably binding the reel and the yoke, and a rope secured to the aforesaid hub and rotatable therewith.

2. A clothes line reel and tightener as set forth in claim 1, the means for adjustably binding the reel and the yoke consisting of a threaded portion on the shaft extending outwardly through one yoke arm and a threaded nut thereon and screwable to a point of contact with the yoke to immobilize the said shaft, reel and yoke.

WILLIAM M. DUNNOCK.

REFERENCES CITED

The following references are of record in the file of this patent:

UNITED STATES PATENTS

| Number | Name | Date |
| --- | --- | --- |
| 584,315 | Amundson | June 15, 1897 |
| 1,028,770 | Moser | June 4, 1912 |
| 1,556,806 | Peterson | Oct. 13, 1925 |
| 1,653,858 | Kindler et al. | Dec. 27, 1927 |
| 2,494,525 | Steuart | Jan. 10, 1950 |